United States Patent Office 2,873,171
Patented Feb. 10, 1959

2,873,171

PREPARATION OF ISOCYANATES

Leslie Hugh Jenkins, Oak Ridge, Tenn., and Daniel Scott Sears, Henrico County, Va., assignors to Virginia-Carolina Chemical Corporation, Richmond, Va., a corporation of Virginia No Drawing. Application July 3, 1956
Serial No. 595,602

6 Claims. (Cl. 23—75)

This invention relates to a process for the preparation of phosphorus and silicon isocyanates. For the purpose of a definition of this invention the term isocyanates is used broadly and includes such sulfur analogs as the isothiocyanates and such chlorine analogs as the chloroisocyanates.

These compounds are represented by the generic formula $$(Cl)_x—A—(N=C=Z)_y$$

in which A is selected from the group consisting of silicon and trivalent phosphorus, Z is selected from the group consisting of oxygen and sulfur, X is an integer from 0 to 3, Y is an integer from 1 to 4 and the sum of X and Y is equal to the valence of A.

These are not new compounds. A process for the preparation of silicon tetraisocyanate and phosphorus triisocyanate has been disclosed in the prior art by a method indicated by the following reaction equations.

$$SiCl_4 + 4AgNCO \xrightarrow{\Delta} Si(NCO)_4 + 4AgCl$$

$$PCl_3 + 3AgNCO \xrightarrow{\Delta} P(NCO)_3 + 3AgCl$$

[Forbes, G. S. and Anderson, H. H., J. Am. Chem. Soc. 62, 761 (1940)]. The preparation of silicon chloroisocyanates has also been reported. [Anderson, H. H., J. Am. Chem. Soc., 66, 934 (1944)]. And a process for prepartion of phosphorus chloroisocyanates has been reported. [Anderson, H. H., J. Am. Chem. Soc., 67, 223 (1945) and loc. cit., 67, 2176, (1945)].

The prior art process employs silver isocyanate or isothiocyanate as the reactant.

We have discovered that it is not necessary to use the expensive, hard-to-recover silver isocyanate. Indeed, our invention provides a cyclic procedure which yields substantial savings. Our most costly reactant is recoverable in at least 75% yield at a purity of 98%. The materials needed for regenerating the reactant are all common chemicals that are readily available.

Surprisingly, the reactant of our cyclic process is lithium isocyanate or isothiocyanate, for the following reasons.

It has been reported in the prior art that potassium isocyanate will give little or no yield of phosphorus triisocyanate when reacted with phosphorus trichloride. Both potassium and lithium are found in group Ia of the periodic table. They are members of the "alkali metal family," which also includes sodium, rubidium, cesium and francium. The thermodynamic equation for the reaction of potassium isocyanate and phosphorus trichloride indicates that they should react more readily than silver isocyanate and phosphorus trichloride. Yet, this is not the case. Numerous attempts failed to yield the desired phosphorus triisocyanate from potassium isocyanate under a variety of reaction conditions. Mixtures of phosphorus trichloride and potassium isocyanate were refluxed in benzene, toluene, xylene, carbon tetrachloride, nitroethane, liquid sulfur dioxide and liquid antimony trichloride and mixtures of two or more of these solvents. Catalytic amounts of various agents, such as cuprous chloride and silver isocyanate were used with the solvents. Attempts were made to react the hot vapors of phosphorus trichloride with potassium isocyanate. In none of these cases was any recoverable amount of product obtained. It was indeed surprising, then, to find that the isocyanate and isothiocyanate of lithium, in the same periodic group as potassium, react with phosphorus trichloride and silicon tetrachloride to yield phosphorus and silicon isocyanates and isothiocyanates.

Broadly speaking, our process is carried out by adding the appropriate phosphorus or silicon chloride to a body of the lithium isocyanate or isothiocyanate suspended in an inert solvent. The resulting mixture is then heated to complete the reaction and the product is separated from the reaction mixture by fractional distillation. Inert solvents that can be used are ones such as benzene, toluene, xylene, mesitylene, ethylbenzene, n-propylbenzene, cumene, tetrahydronaphthalene, naphthalene and other such inert, organic, hydrocarbon solvents.

When it is desired to prepare the chloroisocyanates or chloroisothiocyanates, less than the theoretical amount of the lithium isocyanate or isothiocyanate is used. It is desirable to use an excess of the lithium isocyanate or isothiocyanate when preparing the completely substituted isocyanates or isothiocyanates.

In addition to providing a novel method for preparation of phosphorus and silicon isocyanates and isothiocyanates and their chlorine analogs, our invention provides a cyclic process which recovers the more expensive lithium reactant.

The lithium isocyanate or isothiocyanate reactant is prepared by the reaction of lithium carbonate with urea or thiourea. The product, lithium isocyanate or isothiocyanate is then reacted with the appropriate silicon or phosphorus chloride to produce phosphorus or silicon isocyanates or isothiocyanates and by-product lithium chloride. The lithium chloride, which is insoluble in the reaction mixture, is removed by filtration and reconverted to lithium carbonate by reaction with sodium carbonate.

As pointed out previously, this reaction will not proceed with potassium isocyanate. The instability of silver chloride and the difficulties encountered in its reconversion to the isocyanate render our cyclic process inoperable with the silver salt.

Using phosphorus triisocyanate as an example, our process can be illustrated by the following equations:

(1) $Li_2CO_3 + 2NH_2-\overset{\overset{O}{\|}}{C}-NH_2 \xrightarrow{\Delta} 2LiNCO + 2NH_3 + CO_2 + H_2O$ (2) $3LiNCO + PCl_3 \longrightarrow P(NCO)_3 + 3LiCl$ (3) $2LiCl + Na_2CO_3 \longrightarrow Li_2CO_3 + 2NaCl$ The following illustrates the procedure outlined by the above equations. The parts referred to are parts by weight.

(1) 1500 parts of lithium carbonate was mixed intimately with 1500 parts of urea. This mixture was heated slowly until the material melted. Heating at 200° C. was continued until the melt began to thicken. At this point, more urea was added to reduce the thickening. The addition of small amounts of urea was continued, as the melt thickened, until a total of 3000 parts of urea had been added. Heating was then continued until the melted materials solidified and ammonia evolution ceased.

The solidified material was cooled and crushed to a fine powder. It was then placed in a muffle furnace and heated to 625–650° C. until all the material melted. When melting was completed, the temperature was held at 640° C. for 5–7 minutes.

1700 parts of the resulting impure product was collected, giving an 85.5% yield. This crude product contained 24.2% nitrogen, indicating a purity of 84.6%.

225 parts of this impure material was added to 2400 parts of 95% ethyl alcohol, stirred for two hours and then filtered. The residue, when dried, measured 44 parts and contained 4.87% nitrogen.

The filtrate was evaporated to dryness and the crystals remaining contained 26.5% nitrogen, showing that the recrystallized product contained 92.0% LiNCO.

(2) To 111 parts of the purified LiNCO from (1) suspended in 244 parts of warm, dry benzene was added at a rapid, dropwise rate 85 parts of phosphorus trichloride. The resulting mixture was refluxed gently, with stirring, for three hours. The mixture was then cooled and filtered and the residue was washed with three 88 part-portions of dry benzene. The wash portions and the filtrate were combined.

The benzene was removed from the combined filtrate and washings by distillation. Reduced pressure distillation gave 90 parts of phosphorus triisocyanate; B. P. 60.5–63.0° C./10 mm.; $n_D^{25}$ 1.5320; $d_4^{20}$ 1.515.

Analysis.—Calc'd for $C_3N_3O_3P$: N, 26.76; P, 19.73. Found: N, 26.86; P, 19.66.

(3) The washed residue from (2) (106 parts), which contained 8.14% nitrogen, after evaporation of its benzene content, was dissolved in a minimum of water. Hydrochloric acid was added to destroy excess LiNCO and the pH of the resulting mixture was adjusted to about 7.

The solution was heated and a hot, concentrated (150 parts in 500 parts $H_2O$) solution of $Na_2CO_3$ was added. Heating was continued for one-half hour while the precipitate settled and digested. The mixture was filtered and 58 parts of dry, solid material was obtained. Analysis showed that this solid contained 58.24% carbon dioxide. The theoretical content of carbon dioxide in $Li_2CO_3$ is 59.56% indicating that 75% of the original $Li_2CO_3$ was recovered as a 97.8% pure product.

As stated above, our process is applicable to the preparation of chloroisocyanates or chloroisothiocyanates. The amounts of these materials formed in the reaction depends on the molar ratio of the chloride to the lithium isocyanate or isothiocyanate. The reflux time also influences the product ratio. Theoretically, using $PCl_3$ as an example, one mole of $PCl_3$ with one mole of lithium isocyanate should yield only phosphorus dichloroisocyanate.

$$PCl_3 + LiNCO \rightarrow PCl_2NCO + LiCl$$

However, a mixture of products is obtained. The same is true when two moles of lithium isocyanate are reacted with one mole of phosphorus trichloride although theoretically one mole of phosphorus chlorodiisocyanate should be the only product formed.

Using the procedure shown above for $P(NCO)_3$, and fractionally distilling the resulting reaction mixture, the following results were obtained by varying the ratio of LiNCO to $PCl_3$.

| moles $PCl_3$ | moles LiNCO | Percent Yield (based on $PCl_3$) | | |
|---|---|---|---|---|
| | | $PCl_2(NCO)$ | $PCl(NCO)_2$ | $P(NCO)_3$ |
| 1 | 1 | 60.9 | 18.5 | 14.5 |
| 2 | 3 | 43.0 | 16.3 | 14.0 |
| 1 | 2 | 8.0 | 42.2 | 17.3 |

Phosphorus chlorodiisocyanate was obtained, B. P. 135° C. at 760 mm.; B. P. 54° C. at 25 mm.; $n_D^{25}$ 1.5239; $d_4^{25}$ 1.500. Phosphorus dichloroisocyanate was obtained, B. P. 104° C. at 760 mm.; B. P. 44° C. at 25 mm.; $n_D^{26}$ 1.5111; $d_4^{25}$ 1.512.

The LiCl precipitate formed in these reactions can be recycled as in the preparation of $P(NCO)_3$.

The following illustrates the analogous reaction of silicon tetrachloride with lithium isocyanate. The parts are by weight.

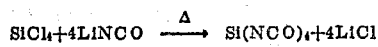
$$SiCl_4 + 4LiNCO \xrightarrow{\Delta} Si(NCO)_4 + 4LiCl$$

300 parts of LiNCO was suspended in warm benzene and 170 parts of freshly distilled silicon tetrachloride was added at a rapid, dropwise rate. When all of the silicon tetrachloride was added, heating was begun. The mixture began to reflux at 57° C. and over a period of three hours the reflux temperature rose to 80° C. Heating at this temperature was continued for four hours.

The reaction mixture was filtered and the filter cake was washed twice with benzene. The wash portions and the filtrate were combined and the product was freed of benzene by distillation. Reduced pressure distillation gave 172 parts of silicon isocyanate; B. P. 86° C. at 13 mm.

Analysis.—Calc'd for $C_4N_4O_4Si$: N, 28.56. Found: N, 28.34.

Actually, it was certainly unpredictable that silicon tetrachloride would react with lithium isocyanate. Attempts were made to react antimony trichloride, antimony pentachloride, tin tetrachloride and titanium tetrachloride with lithium isocyanate. All of these reactions, carried out in warm benzene, failed in our hands to give any amount of product. Thus, it was entirely unexpected to find that silicon tetrachloride reacted with lithium isocyanate.

As in the case of phosphorus trichloride, silicon tetrachloride may be reacted with lithium isocyanate in less than the theoretical amount to prepare the silicon chloroisocyanates having the formulae $SiCl_3(NCO)$, $$SiCl_2(NCO)_2 \text{ and } SiCl(NCO)_3$$

As is the case with phosphorus trichloride, the molar ratios of the reactants and the length of the reflux period govern the amounts of the various products formed.

Phosphorus triisothiocyanate was prepared in much the same manner as the isocyanate.

(1) $Li_2CO_3 + 2H_2N-\overset{S}{\underset{\|}{C}}-NH_2 \xrightarrow{\Delta} 2LiNCS + 2NH_3 + CO_2 + H_2O$ (2) $3LiNCS + PCl_3 \longrightarrow P(NCS)_3 + 3LiCl$ In the following the parts referred to are by weight.

(1) 300 parts of lithium carbonate and 400 parts of thiourea were mixed intimately and heated until the mixture melted and gas was evolved. As the melt thickened, small amounts of thiourea were added periodically until a total of 800 parts was in the mixture. Heating was continued until the weight of the reactants reached 500 parts. The reaction product was cooled and dried over $P_2O_5$ under reduced pressure, ground to a fine powder and stored in an air tight container. This impure material was a grey-white mass which melted below 200° C. It was extremely hygroscopic.

(2) 138 parts of the impure LiNCS prepared in (1) was suspended in 350 parts of warm, dry benzene. 65 parts of phosphorus trichloride was added at a rapid, dropwise rate and when the addition was completed, the mixture was refluxed for 3 hours. At the end of this period the mixture was cooled and filtered. The filtrate was freed of benzene by distillation to a pot temperature of 80° C. at 10 mm., leaving 90.0 parts of a dark, wine-red liquid. This material was $P(NCS)_3$, as shown by the following analysis:

Analysis.—Calc'd for $C_3N_3PS_3$; N, 20.48. Found: N, 20.31.

A second reaction as described above produced an 84% yield of $P(NCS)_3$.

Analysis.—Calc'd. for $C_3N_3PS_3$; N, 20.48; P, 15.12; S, 46.83. Found: N, 20.10; P, 16.4; S, 46.77.

The LiCl precipitate formed in the reaction is easily converted to $Li_2CO_3$ as described above.

Silicon tetrachloride rather than phosphorus trichloride can be used in the above reaction to yield silicon isothiocyanates. Also, various ratios of reactants, that is, chloride to isothiocyanate, will in like manner yield different amounts of the isothiocyanates. Such products will have the following formulas:

For phosphorus:
$P(Cl)(NCS)_2$
$P(Cl)_2(NCS)$
For silicon:
$Si(Cl)_3(NCS)$
$Si(Cl)_2(NCS)_2$
$Si(Cl)(NCS)_3$
$Si(NCS)_4$ There is no definite mechanism that explains why lithium isocyanate and isothiocyanate will react with phosphorus and silicon chlorides. However, it is assumed that the more covalent nature of lithium, as compared to potassium or sodium, etc., is a contributing factor. This tendency to covalency is illustrated by the lower melting points of lithium salts and their greater solubility in organic solvents. The highly ionic nature of potassium salts causes them to have high melting points and low solubility in organic solvents. Thus, it may be that the tendency of lithium to covalency may account for our discovery that the lithium isocyanate and isothiocyanate will react with the chlorides of silicon and phosphorus, whereas potassium isocyanate will not react. We have no explanation for the failure of lithium isocyanate to react with the other metal chlorides shown above.

We claim:

1. Process for the preparation of compounds of the general formula $$(Cl)_X A(NCZ)_Y$$

wherein A is selected from the group consisting of silicon and trivalent phosphorus, X is an integer from 0 to 3, Y is an integer from 1 to 4, the sum of X and Y is equal to the valence of A, and Z is selected from the group consisting of oxygen and sulfur, which comprises mixing a compound of the general formula $ACl_n$ wherein $n$ is the valence of A with a compound of the formula LiNCZ and heating the mixture.

2. Process as defined in claim 1 in which the compound of the formula $ACl_n$ is gradually added to a suspension of the compound of the formula LiNCZ in an inert organic liquid and the mixture is heated to refluxing temperature.

3. Process as defined in claim 2 in which the compound of the formula $ACl_n$ is phosphorus trichloride and the compound of the formula LiNCZ is lithium isocyanate.

4. Process as defined in claim 2 in which the compound of the formula $ACl_n$ is phosphorus trichloride and the compound of the formula LiNCZ is lithium isothiocyanate.

5. Process as defined in claim 2 in which the compound of the formula $ACl_n$ is silicon tetrachloride and the compound of the formula LiNCZ is lithium isocyanate.

6. Process as defined in claim 2 in which the compound of the formula $ACl_n$ is silicon tetrachloride and the compound of the formula LiNCZ is lithium isothiocyanate.

References Cited in the file of this patent

Forbes et al., "American Chemical Society Journal," vol. 62, April 1940, page 761.

Anderson: "American Chemical Society Journal," vol. 66, June 1944, page 934.

Mack et al.: "Textbook of Chemistry," page 285, Ginn and Co., 1949.